Jan. 17, 1939.  G. S. KELLEY  2,144,586
METHOD OF ROCK DRILLING AND DUST REMOVAL THEREFOR
Filed Jan. 13, 1933  2 Sheets-Sheet 1
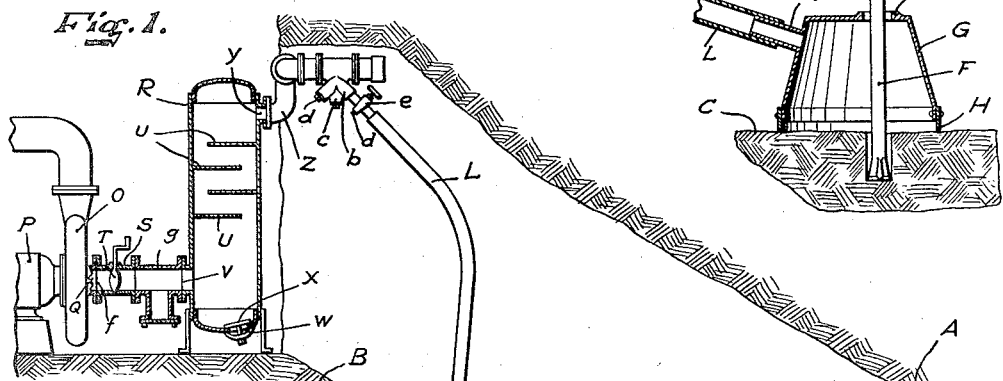
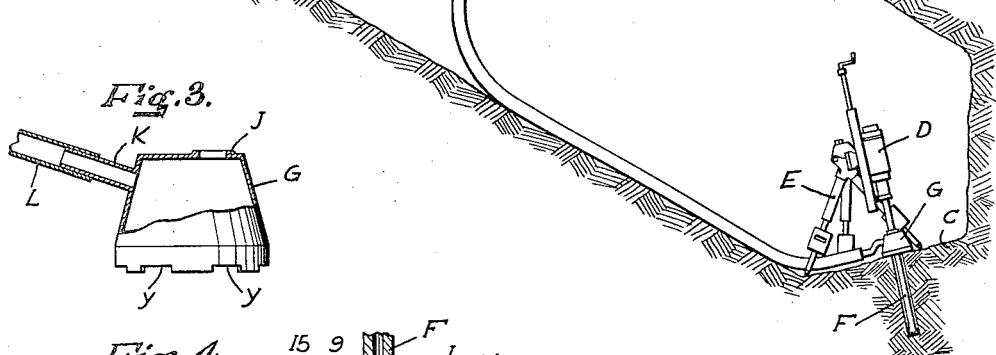
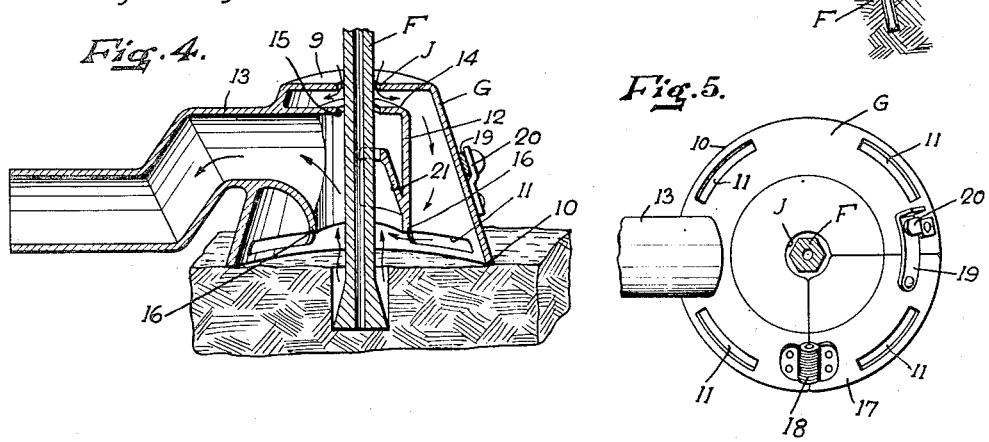
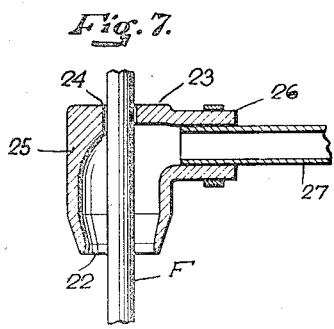
INVENTOR.
GEORGE S. KELLEY,
BY Duell, Dunn & Anderson
ATTORNEYS.

Jan. 17, 1939.  G. S. KELLEY  2,144,586
METHOD OF ROCK DRILLING AND DUST REMOVAL THEREFOR
Filed Jan. 13, 1933  2 Sheets-Sheet 2
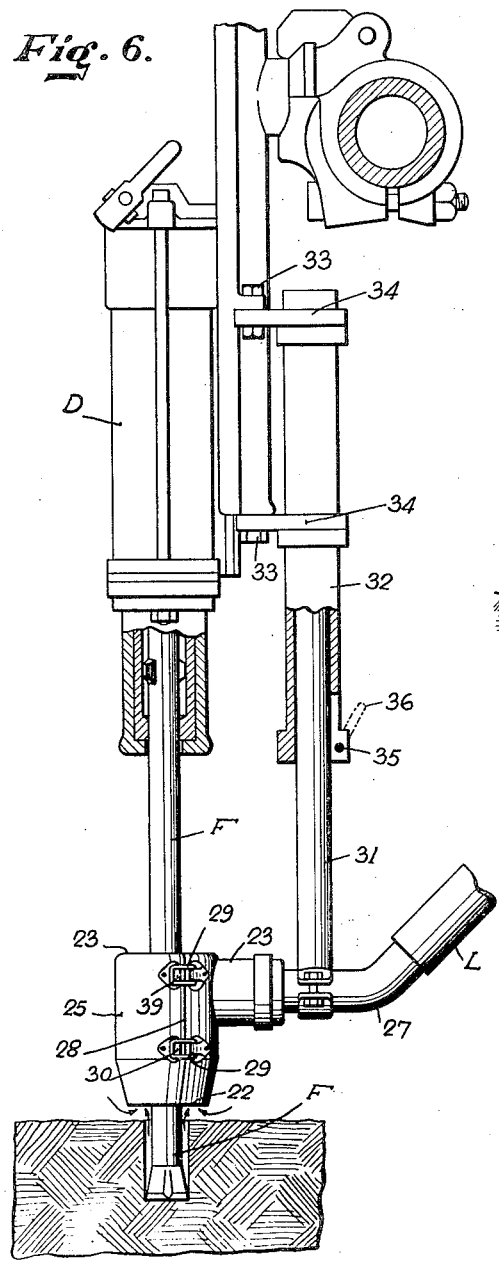
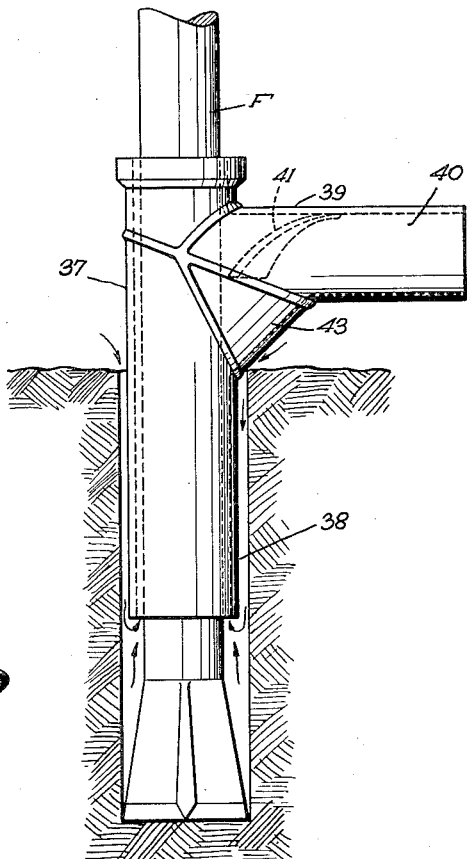
INVENTOR.
GEORGE S. KELLEY,
BY Duell, Dunn & Anderson
ATTORNEYS.

Patented Jan. 17, 1939

2,144,586

UNITED STATES PATENT OFFICE 2,144,586

METHOD OF ROCK DRILLING AND DUST REMOVAL THEREFOR

George S. Kelley, Mount Vernon, N. Y., assignor, by mesne assignments, to Kadco Corporation, New York, N. Y., a corporation of New York Application January 13, 1933, Serial No. 651,481

3 Claims. (Cl. 255—50)

This invention relates to a method of rock drilling and more particularly to a method of removal of cuttings and of dust from holes being drilled by rock drills, which is especially useful to facilitate the drilling and to prevent dispersion of the dust produced thereby.

This application is a continuation in part of my co-pending applications, Serial No. 379,281, filed July 18, 1929, now Patent No. 1,928,291, granted September 26, 1933, Serial No. 583,877, filed December 30, 1931, and Serial No. 624,989, filed July 27, 1932, now Patent No. 1,969,513, granted August 7, 1934.

For many years, rock drills, driven by compressed air, have been used for drilling holes through rocks for foundations of buildings, in mines, in quarries, and for other industrial uses. Until comparatively recently, the only problems concerned with dust removal in the improvement of rock drills, related to the removal of visible dust from the hole being drilled in order to increase visibility by decreasing the dust concentration.

Recently, however, full realization of the harmful effects of minute particles of silica dust to the human lungs has come about. In most localities the dust generated by rock drills contains silicon in the form of silicon dioxide, or quartz. The inhalation of this dust produces a disease known as silicosis, which is generally complicated by tuberculosis of a particularly fatal type. Every operator of rock drills, who is exposed for a sufficient time to such dust, eventually becomes infected. On the examination of an average group of 208 rock drillers, blasters, and excavators in New York city, it was found that 117, or 57% gave evidence of the disease.

The silicosis hazard increases with the dust concentration and length of exposure. The extremely small and invisible particles are the most dangerous. Visible particles over 10 microns in diameter apparently do little damage, but the invisible, finer particles are most dangerous in that they reach the depths of the lungs where injury is produced. The previous efforts to remove dust from drill holes were not concerned with the removal of the finer particles of dust which are invisible to the eye, and which, as a matter of fact, were not known to exist. The seriousness of these finer particles is now, however, fully appreciated, and competent medical authorities have stated that from the viewpoint of the number of people exposed, the seriousness of the malady, and the cost of compensation, there is no industrial health hazard which even approaches silicosis.

There have been proposed a number of methods for the prevention of silicosis. In South Africa, where the first systematic study of silicosis was made, wet drilling is employed as a means of reducing dust pollution from rock drilling. With such systems, the dust is flushed from the hole by water in which the dust is supposed to become suspended. These methods have not proven entirely satisfactory because of the incomplete removal of dust, the inefficiency of operation, the inconvenience occasioned through the supply and handling of the water, the wetting of the operators of the drills, and the difficulty of using water in freezing weather. Another proposed way for the prevention of silicosis is by the use of efficient masks. The really efficient masks, however, because of their bulk and the discomfort caused thereby, workers will not wear regularly, so that their value is seriously impaired. Also, the production of the worker is seriously cut down when the masks are used. Furthermore, dust is still present in the air and visibility is impaired. Another proposed method for the prevention of silicosis is general ventilation, whereby air is forced to the dust polluted areas to dilute the dust polluted air, thereby decreasing the dust concentration. Such systems, however, require expensive, carefully designed and carefully operated ventilating systems, which cannot always be used, since a great deal of drilling is done in open air or in excavations where ventilating systems would be difficult to install and exorbitant in cost, and do not eliminate the silicosis hazard.

According to one feature of the present invention, the pollution of the air which is breathed, is prevented by entraining the dust at its source and conveying and disposing of it at remote points. A considerable amount of air is projected or injected at high velocity through a hollow drill steel of the rock drill being used, into the hole being drilled at the bottom of said hole. The injection of the current of air at the bottom of the hole will cause the simultaneous projection outwardly of the hole of a column of air laden with dust and cuttings from the drilling operation and serve to carry the dust and drill cuttings from the hole into a hood adjacent the hole. To this hood, having openings connecting with the atmosphere, a tremendous suction force is applied, which moves a much larger quantity of air per unit of time than is injected into the hollow drill steel and exhausted by the drill, whereby atmospheric air adjacent the rock drill and the operator thereof, is drawn in at high velocity through the openings in the hood. The outside air thus drawn, by the suction force into the hood, from the atmosphere surrounding the hood and its operator, is carried to a remote point or location, and there the dust is separated from the air and disposed of, while the air is discharged. With this method, the air breathed by the operator of a rock drill is maintained entirely pure and unpolluted by dust. Not only is all of the dust from the hole removed therefrom under the influence of the powerful air force, according to this invention, but the dust produced at the mouth of the hole is drawn into the hood at the mouth of the hole so that the operator remains, during the operation of the drill, in air which is moving away from him towards the source of dust produced, the suction force applied to the hood acting to draw air from all directions to the hood, where it is there indrawn and conveyed away. According to this invention, several important results are accomplished, first, through that portion of the powerful suction force applied to the drill hole, which acts upon the air being exhausted from the drill hole, the movement of the dust and cuttings is expedited and the larger cuttings, which formerly collected at the mouth of the hole, or remained in the hole until pulverized by the drill, are continuously entrained and removed from the drill hole. Another and important result, however, is that the suction force draws in outside or external air surrounding the drilling apparatus and operator, since a greater mass or volume of air per unit of time is exhausted from the hood by the powerful suction force, than is projected through the drill steel into the hole, plus that exhausted by the pneumatic drill, a ventilating flow of air towards the hood from all directions is produced, thus providing a complete and self-sufficient ventilating system and obviating the necessity for a separate ventilating system, such as is usually provided where drilling is carried on in confined areas.

In the previous devices mentioned, in which air was injected into a hole being drilled to remove dust and cuttings therefrom, a portion of the dust-laden air from the drill hole, being under pressure, escaped from the hole and from the apparatus enclosing the hole, there having been no previous methods whereby external air was drawn into the enclosure at the drill hole, as provided in the present invention.

One of the main objects of the present invention is the provision of a practical and efficient method of disposing of the dust coming from holes being drilled by rock drilling apparatus, whereby the escape of dust into the surrounding atmosphere is altogether prevented, and nevertheless the apparatus may be of very simple construction, always in open communication with the atmosphere, and need have no air-tight connection with the hole being drilled.

Another object of the invention is the provision of a simple and efficient method for preventing the escape into the surrounding atmosphere of those extremely fine rock particles which cause silicosis.

Another object of the invention is the provision of a simple and practical method so controlling the disposal of dust and cuttings from rock drilling operations that longer life is given the drill steels, and the holes being drilled are kept clean and free from heavier rock cuttings, all to the end that the drill steel is not called upon repeatedly to operate on rock cuttings which have once been ejected from the hole.

Another object of the invention is the provision of a simple and efficient method of dust removal or control which lends itself especially to drilling operations productive of either large or small quantities of dust per minute, and is equally efficacious under either condition.

Another object of the invention is to draw a greater amount of outside air into a hood, adjacent the hole being drilled by a pneumatic rock drill, through the drill steel of which air is projected into the hole, than is exhausted by the drill and projected into the hole, whereby ventilating air movement towards the hood is produced.

One embodiment of apparatus for the practice of the invention comprises briefly, in addition to the ordinary pneumatic rock drill, through the hollow drill steel of which, compressed air is blown to blow the dust and cuttings from the hole being drilled, a hood enclosing the mouth of the hole, so that the dust and cuttings are blown into said hood, the hood having a central opening in its upper portion through which the drill steel extends, the opening being much larger, however, than the drill steel. There is also provided a very powerful suction pump which is connected to the hood and operated to exhaust from the hood a much greater volume of air per unit of time than is projected into the hole through the hollow drill steel, and is exhausted by the drill, whereby a considerable amount of outside air is drawn into the hood through the opening surrounding the drill steel, by the suction force. The suction force creates a partial vacuum within the hood, by drawing from the hood more air than is projected through the hollow drill steel, so that outside air rushes into the hood through the opening at the top. This inrush of outside air serves several useful purposes. It effectively prevents the escape of dust and cuttings from the hood by the counter-current flow of outside air through the opening in the top of the hood, thus providing an air seal. And this counter-current flows in a direction opposed to the entry of the dust-laden air column from the hole being drilled, thereby decreasing the velocity of the dust and rock particles. By moving a greater volume of air per unit of time than is projected into the hole, and is exhausted by the pneumatic drill, there is provided a continuous ventilating flow of air towards the hood. The powerful suction force also, by creating a partial vacuum in the hood and by removing from the hood a much larger volume of air per unit of time than is projected into the hole, expedites the flow of dust and cuttings from the drill hole, thus facilitating and speeding up the drilling operation, lessening the dulling of the drill steel, and provides other advantages which will be more fully brought out in a following part of this specification.

In a preferred embodiment of apparatus for the practice of this invention, the apparatus utilized is substantially similar to that described in the preceding paragraph, except that the hood adjacent the hole being drilled, to which the powerful suction force is connected to draw in a considerable amount of outside air, is so arranged that the outside air is drawn into the dust-laden air, exhausted from the drill hole, at a point substantially below the outlet through which the mixed outside and dust-laden air passes from the hood on its way to the dust-disposal apparatus. By the mixing of the outside air with the dust-laden air at a point below the discharge from the hood, turbulence of air flow is produced, the velocity head of the dust-laden air is reduced, and the impact of the dust-laden air against the upper portions of the hood is prevented, and the resultant abrasive action by the fast moving particles of dust is reduced. The larger particles of the cuttings are prevented from accumulating at the mouth of the hole by the turbulent air flow, with the result that the larger cuttings are continuously entrained by the air, and carried thereby from the hood. Furthermore, the flow of air through the discharge outlet is expedited by the reduced velocity head, the mixed air stream being more easily diverted in a change of direction on being exhausted from the hood. In the equipment for practicing the invention illustrated in Fig. 6, the mouth of the hood is spaced at a substantial distance from the mouth of the hole being drilled, and the hood is supported from the drill structure. The suction force applied is so powerful that the dust-laden air from the drill hole is sucked into the hood without escaping into the atmosphere, and simultaneously a larger amount of outside air is drawn into the hood at its open lower portion where it is mixed with the dust-laden air.

In another drill arrangement, a nozzle-type hood is utilized as in Fig. 8 which is smaller in over-all diameter than the hole being drilled, and which extends a substantial distance into the hole. With this embodiment, the powerful suction force draws the dust-laden air into the lower portion of the nozzle-type hood, and simultaneously draws a larger amount of outside air into the hole, and then into the lower portion of the hood, where it is there mixed with the dust-laden air.

According to one feature of this invention, instead of dust-laden air escaping from the dust receptacle or hood, provided at the mouth of the hole, into the outside air, outside air is drawn into the hood at all points open to outside air, a powerful suction force being connected to the hood, which exhausts therefrom a considerably larger volume of air per unit of time than is projected into the hole, whereby there is a considerable inrush of outside air into the hood at all points connected with the atmosphere.

According to another feature of the invention, an increased amount of air is continuously injected into the hole being drilled. In the past the "puff" type blow was used, utilizing the exhaust from the drill. With the former arrangements, a continuously injected stream of air would have created a dust condition under which operations could not have been carried on.

According to another feature of the invention, the outside air, which is drawn into the hood at the mouth of the hole, is drawn in and mixed with the dust-carrying air at a point substantially below the point of discharge of the mixed air from the hood, whereby the flow of air from the hood is expedited and the abrasive action of the fast moving dust particles is reduced.

The invention will now be described with reference to the drawings, of which:

Fig. 1 is an elevation partly in section of dust removal apparatus constructed for the practice of the invention, showing the same installed in the slope of a mine;

Fig. 2 is a sectional elevation of a detail of the enclosure or hood over the mouth of the hole being drilled by the pneumatic drill of Fig. 1;

Fig. 3 is a sectional elevation of a modification of the hood shown by Fig. 2, provision being made to admit outside air into the hood at its lower portion, even though the hood is seated upon a smooth surface;

Fig. 4 is a sectional elevation of another form of hood designed for use with the pneumatic drill of Fig. 1, provision being made in this hood for outside air to be drawn into the hood and mixed with air drawn from the drill hole into the hood, at a point substantially below the discharge of the mixed air from the hood;

Fig. 5 is a plan view looking down on the top of the hood of Fig. 4;

Fig. 6 is a side elevation partly in section of another form of hood or dust deflector designed for use with the pneumatic rock drill of the system shown by Fig. 1, and adapted to be mounted to the rock drill so that it may be supported some distance away from the mouth of the hole being drilled. The hood is shown attached to the pneumatic drill;

Fig. 7 is a sectional elevation of the hood of Fig. 6, and

Fig. 8 is an elevation of another form of hood designed for use with the system of Fig. 1, this hood being a nozzle-type hood which is adapted to extend into the hole being drilled.

Referring now to Fig. 1, A represents the material intended to be drilled, such as rock, and B, a shaft or slope on the bottom surface C, of which, is disposed a pneumatic rock drill D, mounted on a tripod E, for actuating a working implement or drill steel F, into the rock A.

The drilling apparatus, so far described, may be of any well known type, but is intended to illustrate the pneumatic type of drill in which air is injected into the hole being drilled by being passed through a hollow drill steel, into the drill hole, to blow the dust and cuttings therefrom.

In the practice of the present invention, a casing or hood G is located or disposed over the hole being drilled, and may have a flexible skirt H attached to the lowermost end thereof, to form a base for the casing G. The skirt H may consist of rubber, or other flexible material.

In order to enable the drill steel F to extend into and through the hood G, an aperture J is formed in the top of the casing. The aperture J is of substantially larger diameter than the body portion of the drill steel F, in order that outside air in substantial quantities may be drawn into the hood between the drill steel and the sides of the aperture.

On the side of the hood G is a hollow extension K which forms an outlet opening from the hood; preferably the hollow extension is located near the top of the hood, and has a flexible hose L attached thereto, for conveying the dust and cuttings from the interior of the hood.

Any suitable means of sufficient capacity to remove from the hood or casing, a considerably larger volume of air per unit of time than is exhausted by the rock drill D, and is projected into the hollow drill, may be provided for withdrawing the dust and cuttings from the hood G. For example, a centrifugal pump or blower O is arranged at the entrance to the slope B, and is connected to the hood G, to remove the dust and cuttings therefrom. The blower O is driven by a motor P, and communicates at its intake opening Q, with a separator tank R, through a pipe S, in which may be disposed a valve T for controlling the volume of flow through the pipe.

The separator tank R is preferably disposed in a vertical position and is provided in the interior thereof with baffles U disposed in staggered relation on opposite sides of the tank so that the air, together with the entrained dust, passing through the tank will follow a serpentine path. Preferably the lowermost baffle U overlies an outlet opening V of the tank R so that when the air and dust passes over the lowermost baffle, the substances of greatest specific gravity will be precipitated to the bottom of the tank and in that way be expelled from the air which then passes from the tank R through the pipe S.

By locating the outlet opening V of the tank R at a point somewhat above the bottom of the tank, the lowermost portion of the tank may serve as a depository for dust and cuttings. To the end that such dust may be readily removed from the tank R, said tank is provided with an opening W in the bottom thereof, and said opening may be normally sealed by a cover X.

At a point in the tank above the uppermost baffle U is an inlet opening Y, from which leads a pipe or header Z, carrying at its opposite end a manifold b to which is connected the flexible conduit L. The manifold b may be provided with a plurality of outlets c to accommodate a plurality of rock drills. When using the apparatus in connection with only one rock drill, all but one of the outlets of the manifold may be sealed by means of plugs d. Preferably a manually operable valve e is interposed between the conduit L and the manifold b, so that in the event that the evacuating apparatus be attached to more than one rock drill, suction to a casing G from the evacuating apparatus may be discontinued during the time that its associated drill is idle, or when changing the drilling apparatus from one site to another.

Due to the present invention, the presence of dust in the vicinity of the drilling operation may be entirely eliminated, and substantially all of the dust so removed will be scrubbed from the air whereby it is entrained prior to the entrance of the air into the blower O. This is very desirable since otherwise the dust which, being finely reduced or pulverized, would act as an abradant on the vanes of the blower and the casing parts, and thus greatly shorten the life of these elements. As an additional precaution, however, a screen f may be interposed in the pipe S to assure the removal of all substances from the air which might have an adverse effect on the evacuating apparatus. Preferably one section of the pipe S is in the form of a T g, the lateral opening h of which may be normally closed by a cover j. The cover j may be bolted or otherwise secured to the T g so that it may be conveniently detached for the purpose of removing any dust or cuttings which may be strained from the air by the screen f.

In operation, when it is desired to start drilling a hole, the casing or hood G is placed, before the hole is started, over the chosen location and the drilling is begun. Thus, the dust at the very outset of the drilling operation is received by the hood G and is not allowed to escape into the atmosphere. The pneumatic drill D is supplied with compressed air from a suitable source (not shown) in the usual manner, the compressed air being supplied to the piston of the pneumatic drill intermittently under the ordinary valve control, and discharged intermittently into the atmosphere adjacent the drill. As a result, the hollow drill steel F is hammered by the piston of the drill in the usual and well known manner. A continuous supply of compressed air, independent of and separate from the air exhausted by the pneumatic drill D, is supplied through the hollow drill steel F, into the hole being drilled, and serves to dislodge the particles of dust and cuttings from the base of the hole, and to blow them, with considerable force, projecting a column of air laden with dust and cuttings from the drilling operation outwardly of the hole into the receiving hood or casing G.

Simultaneously, during the drilling operation the blower O is continuously operated to move from the hood G, through the intermediary of the hose L and the separator R, a considerably larger quantity of air than is projected into the hole through the hollow drill steel F, whereby a partial vacuum, or negative pressure, is created within the hood G, causing a considerable amount of outside air from the atmosphere adjacent the rock drill A, to flow into the casing G through the aperture J surrounding the drill steel F, in the top of the hood G, and into the casing G through those spaces between the apron H and the irregular surface C, with which portions of the apron contact.

The injurious dust produced by drilling is composed of invisible particles of the order of ten microns in size which are breathed by the miners and are too small to be caught in the passages of the nose and throat. These particles lodge in the lungs, and, if breathed in sufficient quantities, gradually fill up the lungs to produce a condition known as silicosis. These invisible particles are formed with the coarse cuttings by the drill steel f and are blown out from the hole by the usual current of air provided for the purpose. According to this invention, the presence of these particles of dust, in the air adjacent the operator, is prevented, the blower O being of greater capacity than the air consumption of the drill. Thus, a greater amount of air is drawn into the case G than is used at the pneumatic drill d, both for the intermittent reciprocation of the piston (not shown) in the drill and the continuous blowing of the cuttings from the drill hole. A constant current of air into the mine shaft or tunnel is thus produced from the outer air which is directed towards the dust case G, and the air with which the miner comes into contact is therefore always fresh from the open air.

As described above, the outlets of the manifold may be closed by the plugs d when not connected to drills. However this system is particularly suited for ventilating a heading or drift and the usual ventilating apparatus preferably is omitted. In this case the outlets of the manifold may be left open so as to draw off more of the impure air in the drift, thus causing a greater draft of air in the direction of the drill operator and others working in the vicinity.

Referring now to Fig. 3, the hood G there shown is very similar to that shown by Fig. 2, but has the additional provision that the slots Y are formed at spaced distances around the circumference of the base. These slots are provided in order that when the casing G is placed upon an occasional smooth surface, outside air may be drawn in at the lower portion of the casing G, in addition to that drawn in through the aperture J.

Utilization of the hoods shown by Figs. 4 and 8 inclusive are preferred. In these latter embodiments, the outside air, drawn into the hoods, is mixed with the dust-laden air from the hole at points substantially below the points of exit of mixed air from the hoods.

Referring now to Figs. 4 and 5, the dust deflector, hood, or casing G is adapted to encircle the hollow drill steel F at the aperture J in the end wall 9 of the hood. The lower edge or rim 10 of the hood G consists of an even surface so that when it seats upon the rough surface of a rock being drilled, sufficient voids or spaces will exist between the rock and rim to afford free communication between the interior of the hood and the atmosphere. The aperture J is also made of sufficiently larger diameter than the body portion of the drill steel F, to permit the free entrance of a large amount of atmospheric air into the hood around the drill steel. The hood G may also be provided in its lower portion with the slots 11, communicating with outside air. The hood G is provided with an inner hood or nozzle 12 disposed within the hood G and having a lateral extension 13 extending through the side wall of the outer hood. This extension 13 is hollow to form a continuation of the inner hood or nozzle 12 and the other end of the extension is adapted to be connected with the flexible hose L (Fig. 1). The nozzle 12 is arranged intermediate the ends of the hood G. That is, the end wall 14, which forms the uppermost extremity of the nozzle, is spaced a sufficient distance from the outer walls of the hood G to permit the free passage of air therebetween, and in the end wall 14 there is provided an aperture 15 to accommodate the drill steel F. This aperture 15 need not be of substantially greater diameter than the drill steel, since, with the arrangement described, the air is drawn into the inner hood or nozzle 12 around its lower portion 16.

The lower end 16 of the inner hood or nozzle 12 is spaced a substantial distance above the rim 10 of the outer hood G in order that the outside air, drawn into the hood G, may flow freely and in unrestricted volume around the lower end 16 of the nozzle, between the lower end 16 of the nozzle and the surface on which the hood is seated.

In order that the hood G may be placed around the hollow drill steel F, a cover 17 is pivotally connected to the hood G, by means of the spring-pressed hinge 18. The latch 19 is pivotally connected to the cover 17 and adapted to engage a clip 20 on the side of the hood G. While Fig. 5 shows only the arrangement of the outer hood G, the nozzle 12 is provided with a hinged portion similar to the cover 17, which is attached to the cover, and moves with same when the cover is opened, to permit the hood to be placed around the drill steel.

In order that the cuttings withdrawn from the outer hood may be easily directed from the nozzle to the passage in the extension 13, the nozzle 12 may be provided in its interior with a baffle arrangement, comprising a pair of deflectors 21 (only one of which is shown) which are inclined towards the outlet 13, and serve to positively to deflect the particles drawn into the nozzle 12 towards the outlet 13.

The operation of the device is as follows: With the deflector disposed about the drill steel F and the rock drill C and the evacuating apparatus in operation, the dust and cuttings expelled from the hole G are blown directly into the inner hood or nozzle 12 and are drawn through the nozzle, together with atmospheric air and dust entering the hood at the various apertures or spaces at the top and bottom of the hood.

In practice the construction as in Fig. 4 has been found to be highly efficient. This is due partly to the fact that the inner hood or nozzle 12 is so positioned that the greater portion of the cuttings expelled from the drill hole G pass directly into the nozzle, and in part to the spacing of the inlet opening 16 of the nozzle with respect to the rock face upon which the deflector rests. By suspending the inner hood or nozzle above the rock face in the manner described, sufficient space is provided for admission of a considerable volume of atmospheric air to the nozzle and then to the evacuating apparatus, thereby assuring the complete removal of the dust created in the drill hole and that freed from the rock face by the operator.

With this arrangement, it is to be noted that the outside air, drawn from the atmosphere, enters the dust-laden air below the lower portion, or rim, 16 of the nozzle 12, and that this point is substantially below the outlet 13. The flow of the outside and dust-laden air is indicated by the arrows. The angularly directed outside air thus mixes intimately with the high velocity, dust-laden air, and a turbulent condition is created with the result that the larger cuttings which, in the past, due to their mass, have accumulated at the mouth of the drill hole, are kept in movement by eddy currents and are continuously entrained by the air. Furthermore, the velocity head of the dust-laden air from the drill hole is reduced considerably, so that the dust and cutting particles do not impact with any considerable velocity against the upper portion of the nozzle 12 and the upper portion of the outlet 17, so that their abrasive action is substantially reduced, if not avoided altogether. Furthermore, by the reduction of the velocity head of the upwardly projected, dust-laden air, it is diverted more easily in its change of direction out the angularly placed outlet 13.

Referring now to Figs. 6 and 7, there is disclosed another form of hood for the reception of dust produced in drilling operations. This hood differs from those previously described in this specification in that it is spaced above the surface being drilled and is supported on the pneumatic drill. This hood 25 may be made of rubber or any other suitable material, and is substantially cylindrical in form, having an open lower portion 22, and an upper portion 23 which is closed except for a central opening 24, through which the hollow drill steel F extends. In this form of hood, the opening 24 is preferably larger than the body portion of the drill steel F, so that a portion of the indrawn air may enter this opening.

On the side of the hood 25, and preferably forming an integral part thereof is an extension 26, which serves to form an outlet opening for the air taken into the interior of the hood 25. A discharge pipe 27 is secured within the extension 26 and is adapted to receive the flexible hose L of the system shown by Fig. 1.

In order to enable the hood 25 to be readily applied laterally to the drill steel F at any point immediate the ends thereof, the hood is split longitudinally at 28 so that the flexible hood may be conveniently opened to permit the drill steel to pass sideways therethrough. The hood may be maintained closed about the drill steel in any suitable manner, as by the hasps 29 on one side of the slit 28, engaging buttons or lugs 30 on the other side of the slit. In order that the hood 25 may be held in the correct operative relationship with respect to the drill steel F, and the surface in which the hole is being drilled, the hood is provided with a guide rod 31 which is clamped to the pipe 27, which, in turn, is secured to the extension 23 of the hood. The guide rod 31 is slidably clamped in the guide member arranged parallel to the drill steel F of the pneumatic drill. The guide member 32 is attached to the body of the pneumatic drill by means of the bolts 33, which pass through the lugs 34, which support the guide member.

The guide rod 31 is clamped to the guide member 32 by means of the screw 35, which is adjusted by the lever 36. The lower end of the guide member 32 is slotted, and the screw 35 passes through threaded portions on each side of the slot, so that as it is screwed in or out by movement of the lever 36, it tightens or loosens the guide member 32 about the rod 31, permitting the rod 31 to be raised or lowered, to adjust the position of the hood 25, above the surface of the rock, or other material being drilled.

The hood 25, shown by Figs. 6 and 7, is adapted to be used with the pneumatic drill D of Fig. 1. Compressed air is forced through the hollow drill steel F into the hole being drilled and blows the dust and cuttings from the hole. The powerful suction force, applied through the pipe L to the hood 25, prevents the escape of dust and cuttings into the atmosphere, by drawing the dust and cuttings into the open lower portion 22 of the hood 25. Simultaneously, outside air, in larger quantities, is drawn into the lower portion 22 of the hood 25 to mix with the dust-laden air. The mixture of the outside and the dust-laden air serves the purpose, as explained in the discussion of the hood shown by Figs. 4 and 5, of reducing the velocity head of the upwardly moving, dust-laden air, of preventing the deposition of the larger cuttings, of preventing the abrasive action of the dust particles, and of enabling the dust-laden air to be more easily diverted, in its change of direction, through the angularly placed, outlet extension 23. The arrows indicate the movement of outside air and dust-laden air into the lower portion of the hood. Although it is intended that the hood 25 be spaced a substantial distance above the surface being drilled, so that the dust-laden particles have to travel a substantial distance after leaving the hole before they enter the lower portion of the hood, the suction force applied to the hood is so powerful that it creates a partial vacuum within the hood with the result that the dust-laden air and a larger quantity of outside air rush into the lower portion of the hood, without any escape of the dust into the atmosphere.

Referring now to Fig. 8, there is disclosed a nozzle type hood for the collection of dust. This hood comprises a substantially cylindrical main body portion 37, which is of smaller diameter than the hole 38 being drilled. This body portion 37 has a central opening, slightly larger than the hollow drill steel F, which passes therethrough. This form of hood is placed over the upper end of the drill steel F before it is placed in the penumatic drill. In the upper portion of the hood there is arranged the right angle extension 39, which is preferably made an integral part of the hood. This extension 39 has a central opening 40, which serves as the outlet opening for the discharge of the mixed, dust-laden air and the outside air which is drawn into the hood. Arranged within the discharge outlet 40, adjacent its point of merger with the interior of the hood, is placed the curved baffle 41, which assists in diverting the air in its change of direction on its way from the hood through the outlet opening.

This form of hood is adapted to be used with the pneumatic rock drill shown by Fig. 1. In operation, a continuous supply of compressed air is blown through the hollow drill steel F, and dislodges the dust and cuttings from the bottom of the hole, causing them to fly outwardly. Normally, of course, if there were no powerful suction force applied to the hood, the dust particles wound pass out of the hole 38, around the body member 37 of the hood, but, according to this invention, a powerful suction force is applied to the hood through the outlet opening 40 in the extension 39, and through the flexible hose L, of Fig. 1, which is adapted to be clamped over the extension 39. Instead of the dust-laden particles escaping out the hole, a considerable volume of outside air is drawn into the hole through the space around the sides of the body portion 37, and enters the open lower portion 42 of the hood, and forces the dust-laden air to enter the lower portion 42 of the hood also. The movement of the outside air and the dust-laden air is indicated by the arrows. With this form of hood, the outside air is mixed with the dust-laden air at a point substantially below the surface of the hole being drilled. The dust-laden air is mixed with a larger quantity of outside air, which dilutes, so to speak, the dust-carrying air stream and thereby enables it to more easily carry its load of dust and cuttings. The air drawn into the lower portion of the hood travels upwardly through the central opening in the body portion 37, until it reaches the central opening in the extension 39. The extension 39 has an enlarged portion 43 which is placed at substantially 45° to both the body portion 37 and the extension 39. This affords an enlarged air passage at the point where the dust-laden air is diverted from the body portion of the hood into the outlet portion. The provision of this enlarged air passage serves to reduce the velocity head of the air stream diverted through the discharge outlet 40, thus assisting the action of the outside air in its mixture with the dust-laden air.

The embodiments of the hoods described in connection with Figs. 2, 3, 4, 5, 6, 7 and 8 are all intended to be used with the general system shown by Fig. 1. All of the hoods described are operated in conjunction with the system shown by Fig. 1 in that more outside air is drawn into the hoods than is discharged in the hole through the hollow drill steel and is exhausted by the drill. In the embodiments disclosed in Figs. 4 to 8 inclusive, the outside air is mixed with the dust-laden air at a point substantially below the point of discharge from the hood, these embodiments being the preferred ones because of the advantages brought out in the foregoing discussion.

According to this invention, not only is the health of operators of pneumatic drills safeguarded by the prevention of dust in the air breathed and the provision of a complete and self-sufficient ventilating system, but there are numerous other advantages which will now be described. Due to the powerful suction force applied to the hood, the cuttings are exhausted from the hole at such a rate that the drilling operations are speeded up a considerable amount. The bits of the drill steels are impeded less in their drilling action and are not dulled by accumulated quantities of cuttings in the bottom of the hole, as they formerly were, with the result that the bits are not dulled so frequently, and need not, therefore, be sharpened so frequently. This results in a tremendous saving in that not only can the drill be continuously operated at full throttle, which was impossible heretofore, but the drills need not be taken out of service at frequent intervals to replace the dulled bits with sharpened bits, as has been the practice in the past.

Due to the tremendous suction force applied at the mouth of the hole, the back pressure at the bottom of the hole is considerably reduced. This results in greatly increased velocity of the air introduced into the hole through the hollow drill steel, with the result that the bottom of the hole is being continuously and violently snubbed to displace the larger cuttings, thus preventing their being reground to finer particles. In the past, the larger cuttings produced by the drill accumulated in the bottom of the hole and were pulverized by the drill steel. This regrinding caused the drill steel to become quickly dulled and also required considerable power. It is known that the power required to pulverize material varies as the fifth power of the size of the particles. According to this invention, the larger cuttings are being continuously displaced from the bottom of the hole and entrained by the outwardly moving air, so that they are not pulverized, with the result that the power previously required for their pulverization is saved. Furthermore, due to the removal of the larger cuttings, the drill steel is not impeded by them, and, as a result, can devote its entire effort to deepening the hole, the cuttings being disposed of by the outwardly moving air. Tests of a standard driven system with and without the invention show that a 50% increase in drilling speed is gained by employing the present invention.

It will now be seen that, whatever be the design of the hood employed in practicing the method, an important aspect of the invention involves the dilution of the dust and air mixture received by the hood from the hole being drilled. The clean outside air is drawn into the hood simultaneously with the dust-laden air from the hole being drilled, the clean outside air being drawn into the hood in much greater volume per unit of time than the dust-laden air delivered from said hole per unit of time. This is greatly to increase the proportion of air to dust in the hood over than in the dust laden column projected from the hole. Hence, should the amount of dust in the hole be so great in proportion to that of air that the dust-laden column leaving the hole is heavy with dust and might tend to clog the hood, or the discharge conduit leading from the hood, the supplemental clean air gives sufficient added volume of air readily to carry the larger amount of dust. As has been described, provision is made for varying the distance from the rock face to the mouth of the hood. Thus the size of the passageway between the rock face and the hood may be increased or decreased. In this wise, should the drill encounter material productive of excessive dust, the same hood may be varied in position in relation to the rock face so as to let in more clean air until the very dusty mixture from the hole is diluted sufficiently to prevent clogging of the hood and also to prevent clogging of the conduit or hose L through which the dust-laden air is carried away from the hood. Thus a greater volume of outside air, as compared to the air from the hole, is always passing into and out of the hood, so that the volume of air entering the hood is always sufficient to carry away the dust normally produced and also dust when produced in some excess above normal.

It will also be seen that whatever be the form of hood used in carrying out the method, the column of dust-laden air moving outwardly of the hole being drilled is subjected, adjacent the mouth of the hood, to laterally flowing currents of outside air flowing in directions to confine and envelop and laterally repress said dust-laden air column. For example, in Fig. 6, the suction in the hood 25 not only draws clean outside air into the mouth 22 of the hood, but currents of outside air thus established flow inwardly into contact with the dust-laden column from all sides of said column. These inwardly directed currents of outside air surround the dust-laden column on all sides and act to oppose lateral dispersion of the dust of the column into the surrounding outer air and also to confine the dust to the column coming from the hole and direct it into the hood. Hence, though the dust-laden air column from the hole travels through an outer air gap before coming into contact with the guiding wall of the hood, the dust in said column nevertheless is retained by and confined to said column while passing said gap.

When drilling may result in production of considerable amounts of coarse rock cuttings and chips, which might accumulate on the outer rock-face bordering the hole and drop back into the hole, it is desirable to prevent the formation of these accumulations or to remove them before damage is done. To this end the present method utilizes an air-guiding hood or casing having a mouth of greater diameter than the mouth of the hole being drilled, as shown for instance in Figs. 4 and 6. The mouth of the hood is located in line with the axis of the hole so that the dust-laden air column will be projected thereinto from the hole. Said mouth is also disposed so as to cover a relatively large annular area of the outside rock bordering said hole. With such arrangement, the currents of outside air flowing inwardly toward the hole and over the outside rock surface to contact with the dust-laden air column will either keep said bordering rock surface clear of the rock cuttings or will dislodge accumulation from this bordering surface and carry it into the hood, whence it will be discharged along with the remainder of the dust and air.

Dust and rock cuttings impinging with considerable velocity on the walls of the hood have an abrasive action which it is desirable to avoid as far as possible. A feature of the present method is the mode in which the particles or rock dust and cuttings have much of their kinetic energy reduced. Referring to Fig. 3, for instance, the clean outside air not only enters at the mouth of the hood through the apertures y, thereby thinning out the mixture of air and rock particles arriving from the hole, but an abundance of clean air also enters the hood through the aperture J in a direction opposed to the entry of the dust-laden air column from the hole.

It is obvious, therefore, that a few drills, according to this invention, can be continuously operated to perform the work of a much larger number of drills which were used heretofore to accomplish the same results. Fewer operators and fewer drills are, therefore, required; the overhead expense for a drilling project is reduced, and the labor cost, in operation, is correspondingly reduced. The operators work in clean, undefiled air, with full visibility, without restraint of filter masks, and in perfect comfort, with the satisfaction of knowing that their health is not being impaired by occupational menaces.

While the invention has been described in connection with the operation of a single rock drill, it should be understood that any suitable number of rock drills may be operated simultaneously, according to this invention, the blower O being operated at a capacity sufficient to remove from all of the hoods, associated with the rock drills in operation, a greater volume of air per unit of time than is injected into the holes being drilled and is exhausted by the drills.

While the invention has been illustrated in the drilling of holes in the slope of a mine, it should be understood that the invention may be practiced in the open and in any location where it is desired to drill holes.

Furthermore, while the invention has been illustrated in connection with drilling of a vertical hole, it should be understood that the drilling, according to this invention, may be horizontal drilling, or the holes being drilled may be at any desired angle.

While one or more embodiments of apparatus for the practice of the invention have been described, it should be understood that the invention is not to be limited to the details described, since many changes and other embodiments may be made by those skilled in the art without departing from the spirit of the invention.

What is claimed is:

1. The method of rock drilling which comprises drilling a hole, injecting a current of air at the bottom of said hole during the drilling operation and simultaneously projecting a column of air laden with dust and cuttings from the drilling operation outwardly of said hole, locating the mouth of an air-guiding hood in line with the axis of the hole, continuously maintaining the interior of the hood in free and open communication simultaneously with the hole and with the outside air for the entry of outside air into the hood at all times during the drilling operation, continuously drawing clean outside air and dust-laden air from said hole simultaneously into said hood, the clean outside air in greater volume per unit of time than that of the dust-laden air delivered from said hole into said hood per unit of time by establishing currents of outside air flowing inwardly to said column from all sides of the column and into said hood and between said hole and the mouth of said hood, and laterally confining and enveloping the dust-laden air column between said hole and hood by said inwardly flowing currents of outside air, and continuously maintaining negative pressure in said hood during receipt of said dust-laden column, and continuously sucking dust-laden air from said hood.

2. The method of rock drilling which comprises drilling a hole, injecting a current of air at the bottom of said hole during the drilling operation and simultaneously projecting a column of air laden with dust and cuttings from the drilling operation outwardly of said hole, locating the mouth of an air-guiding hood in line with the axis of the hole, continuously maintaining the interior of the hood in free and open communication simultaneously with the hole and with the outside air for the entry of outside air into the hood at all times during the drilling operation, continuously drawing clean outside air and dust-laden air from said hole simultaneously into said hood, the clean outside air in greater volume per unit of time than that of the dust-laden air delivered from said hole into said hood per unit of time, and thereby greatly reducing the dust content in the hood per unit volume of air as compared with the dust content per unit volume of air discharged from the hole, and continuously sucking from the hood a greater volume of air per unit of time than that injected into said hole per unit of time and thereby maintaining negative pressure in said hood and accelerating the movement of air from the hole into the hood.

3. The method of facilitating rock drilling where air is projected under pressure into the hole to blow the dust therefrom, which comprises reducing considerably the back pressure at the bottom of the hole, greatly increasing the velocity of the air introduced into the hole over that resulting from the pressure which projects it into the hole, continuously displacing the larger cuttings produced by the drill from the bottom of the hole and from the path of the drill, entraining said larger particles in the accelerated air stream leaving the hole, removing said particles from the hole together with any dust produced by the drill, providing an air guiding hood at the mouth of the hole and in line with the axis thereof, continuously maintaining the interior of said hood in free and open communication simultaneously with said hole and with the outside air, preventing expansion into the atmosphere of the dust-laden air leaving the hole by indrawing it into said hood together with an encircling column of outside air, substantially reducing the velocity head of the dust-laden air within said hood by indrawing into it a larger quantity per unit of time of oppositely directed outside air, and continuously removing the mixed dust-laden and outside air from said hood.

GEORGE S. KELLEY.